Jan. 26, 1971     A. B. BROERMAN     3,557,532
CHROMATOGRAPHIC ANALYSIS COLUMN AND METHOD
Filed Sept. 4, 1969
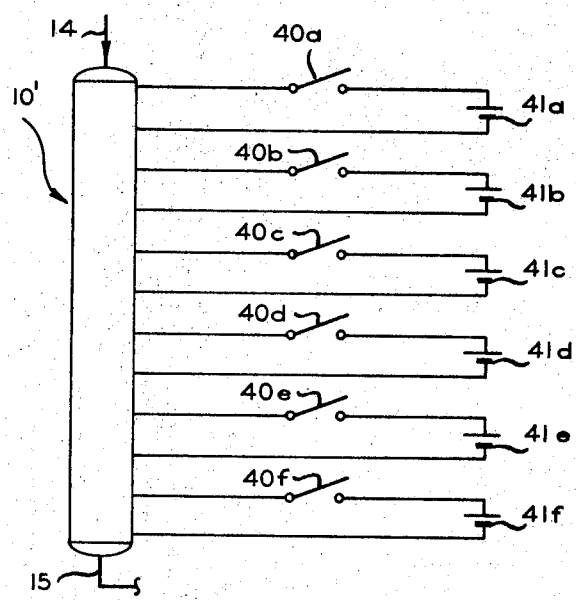
FIG. 4
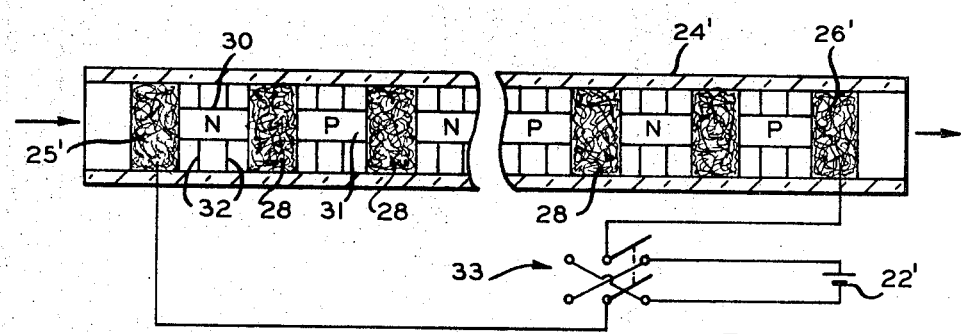
FIG. 3
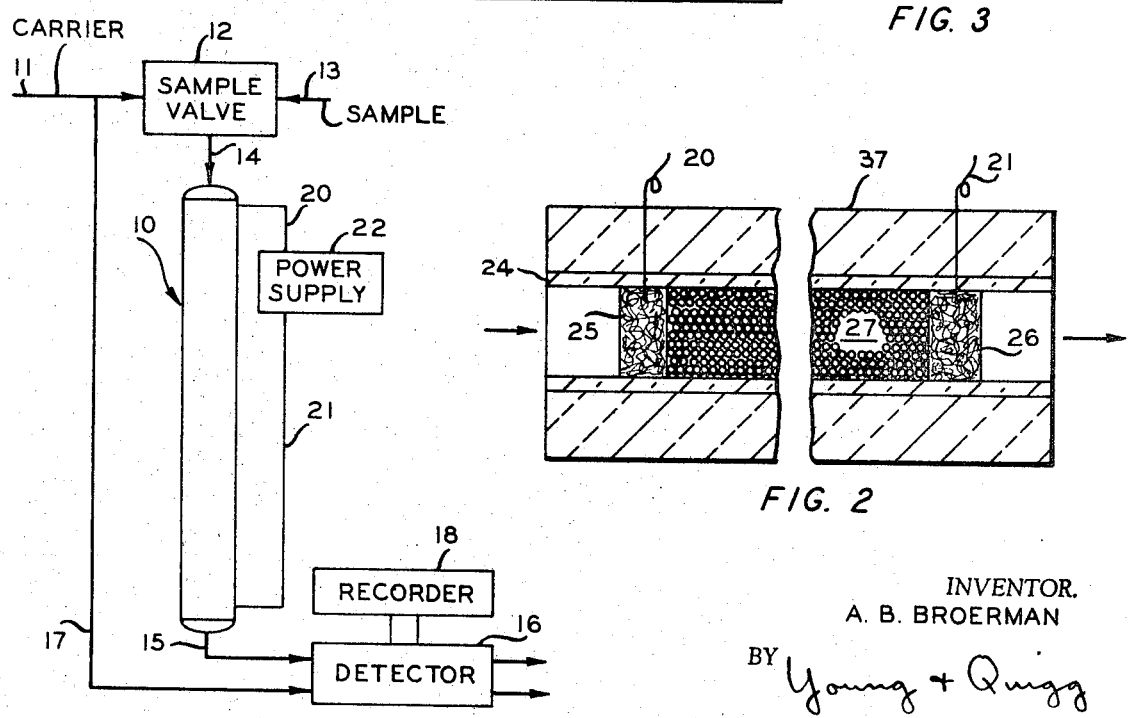
FIG. 2
FIG. 1
INVENTOR.
A. B. BROERMAN
BY Young + Quigg
ATTORNEYS

3,557,532
CHROMATOGRAPHIC ANALYSIS COLUMN AND METHOD

Arthur B. Broerman, Bartlesville, Okla., assignor to Phillips Petroleum Company, a corporation of Delaware
Filed Sept. 4, 1969, Ser. No. 855,331
Int. Cl. B01d 15/08
U.S. Cl. 55—67
7 Claims

ABSTRACT OF THE DISCLOSURE

A chromatographic column contains spaced electrodes and material therebetween which changes in temperature when current is passed through the material. The material can be a resistance heating material, such as vitreous carbon, or a thermoelectric material, such as bismuth telluride.

---

It is common practice to control the temperature of chromatographic columns in order to provide more efficient and rapid separations. One procedure involves establishing a moving temperature gradient along the column by moving an external heater from one end of the column to the other. Other procedures involve heating columns by various means, such as jackets through which a heat exchange material is circulated, inductive heating coils, and resistance heating wherein the column wall serves as the resistance heating element. While these procedures are useful in many operations, they have certain drawbacks. When external heaters are employed, there is a time lag between a change in temperature of the heater itself and a corresponding change in temperature of the column packing. A time lag also occurs when electrical resistance heating of the column wall is employed. These time lags result primarily from the fact that conventional packing materials are relatively good heat insulators. While inductive heating tends to reduce the time lag, the necessary equipment is relatively complex and can present maintenance problems in field operations.

In accordance with this invention, improved methods are provided for heating chromatographic columns. In one embodiment, the packing material itself is formed of an electrically conductive material. One example of such a material is vitreous carbon. Electrodes are mounted in spaced relationship within the column, and current is passed through the packing material. This results in applying heat directly to the column packing. In another embodiment of this invention, the interior of the column contains thermoelectric material which receives current from an external source. The passage of current through the thermoelectric material results in alternate hot and cold zones within the column. The direction of current flow can be reversed periodically to transfer the hot and cold regions, thereby increasing the rate of separation within the column.

In the drawing, FIG. 1 is a schematic view of a chromatographic analyzer having an embodiment of the improved column of this invention incorporated therein. FIG. 2 is a cross-sectional view of a first embodiment of the column of this invention. FIG. 3 is a cross-sectional view of a second embodiment of the column of this invention. FIG. 4 illustrates a modified form of the heated column.

Referring now to the drawing in detail and to FIG. 1 in particular, there is shown a chromatographic column 10. A carrier fluid is introduced through a conduit 11 which communicates with a sample valve 12. A sample of material to be analyzed is introduced into valve 12 through a conduit 13. The outlet of sample valve 12 is connected by a conduit 14 to the inlet of column 10. The effluent from column 10 is directed through a conduit 15 to the first channel of a detector 16. A portion of the carrier fluid is directed through a conduit 17 to a second channel of detector 16. The output signal from detector 16, which is representative of differences between the compositions of the two fluids passed therethrough, is applied to a recorder 18.

The apparatus thus far described constitutes a conventional chromatographic analyzer. At the beginning of the analysis cycle, valve 12 is actuated to introduce a predetermined volume of the sample into column 10. Thereafter, carrier fluid is passed through the column to elute the sample constituents in sequence.

In accordance with this invention, the fluid permeable packing material within column 10 is heated and/or cooled to improve the efficiency of separation of the constituents of the sample being analyzed. This is accomplished by the passage of electrical current through material contained within the column. To this end, electrical leads 20 and 21 connect a current source 22 to column 10.

A first embodiment of the column of this invention is illustrated in FIG. 2. The column is formed of tubing 24 of electrically insulating material, which can be glass, quartz or various plastic materials, for example. Electrodes 25 and 26 are disposed in the respective ends of the column. These electrodes can advantageously be porous elements formed of an electrically conductive material. An example of such an element is the "Fuzz Button" described in Data Sheet FB–001 of Technical Wire Products, Inc., 129 Dermody St., Crawford, N.J. (1966). Fuzz buttons are formed by die compressing a charge of cohesive fine-knitted wire mesh. Steel wool or similar material can also be employed as the column electrodes. The region between electrodes 25 and 26 is filled with a packing material 27 which is electrically conductive. A material which is particularly suited for this purpose is vitreous carbon in particulate form. This material is available commercially from Beckwith Carbon Corporation, 16140 Raymer St., Van Nuys, Calif. Vitreous carbon is electrically conductive and has a relatively low porosity compared to other forms of carbon. Electrodes 25 and 26 are connected to respective leads 20 and 21 so that the flow of current between these electrodes results in resistance heating of packing material 27. The temperature of the interior of the column can thus be regulated by controlling the flow of current through material 27. Tubing 24 is surrounded by a mass of insulating material 37 to permit more precise control of temperature within the column itself. The output of current supply 22 can be adjusted with respect to time to vary the temperature of the interior of the column during the analysis. As is well known in the art, controlled heating of chromatographic columns can be employed to speed analyses and to concentrate constituents. Such columns are often used in multi-column systems wherein the heated column serves as a concentration column.

A second embodiment of the column of this invention is illustrated in FIG. 3. Electrodes 25' and 26' are disposed in opposite ends of a tubing 24'. Additional electrodes 28 are mounted in spaced relationship with one another between electrodes 25' and 26'. Elements of thermoelectric material are disposed within tubing 24' between the spaced electrodes. For example, a bar 30 of such material is disposed between electrode 25' and an adjacent electrode 28, and a second bar 31 is disposed between the next two electrodes 28. These bars are formed of a thermoelectric material, such as bismuth telluride. This material is a semi-conductor, and can contain certain impurities to form either P or N type elements. As illustrated, bar 30 is N material and bar 31 is P material. Similarly, the additional bars through the column are alternately N and P materials. The passage of current through the column packing from electrode 25' to electrode 26' thus results in alternating hot and cold zones along the length of the column. As illustrated, the individual bars can be provided with protruding pins 32 which serve to center the bars in the column and provide space for the passage of fluid through the column.

Provision is made for reversing the direction of current flow through the column packing of FIG. 3 in order to change the locations of the respective hot and cold zones. This is accomplished by connecting electrodes 25' and 26' to a current source 22' through a reversing switch 33. During operation, reversing switch 33 can be actuated periodically to reverse the current flow and thus change the locations of the hot and cold zones. At the cold zones, the sample constituents are more strongly retained by the column packing material, whereas the constituents are more readily displaced from the hot zones. By alternating the zones, a more rapid separation is provided because the hot zones are effectively moved along the column. The interior of the columns of FIGS. 2 and 3 can contain any conventional packing material, either solid or liquid, in addition to the illustrated structure. As an alternative to the illustrated bars of thermoelectric material, powdered material of the same general type can be used. This results in a substantially greater number of hot and cold zones within the column. An arrangement of this type is illustrated in FIG. 2 wherein material 27 constitutes powdered thermoelectric material.

As previously mentioned, it is often desirable to move a heated zone along the column to assist in displacing sample constituents. This can be accomplished by the apparatus illustrated in FIG. 4 wherein a plurality of current sources 41a, 41b . . . 41f are connected to column 10' through respective switches 40a, 40b . . . 40f. Column 10' can contain a plurality of separate spaced heating elements of the type shown in FIG. 2 which are connected to the individual current sources. By sequentially closing switches 40a, 40b . . . 40f, the heated zone is moved along the column to displace the sample constituents.

While this invention has been described in conjunction with presently preferred embodiments, it obviously is not limited thereto.

What is claimed is:

1. An improved chromatographic column comprising an elongated tube having an inlet and an outlet and formed of electrically insulating material, packing material disposed within the interior of said tube, first and second fluid permeable electrodes positioned within said tube in spaced relationship with one another, a plurality of thermoelectric elements extending between and making electrical contact with said electrodes, a source of electric current having first and second terminals, and means connecting said first and second electrodes to said first and second terminals, respectively, to pass current through said thermoelectric elements and thereby change the temperature of the packing material within the tube.

2. The column of claim 1 wherein said source of current is a direct current source, and wherein said means connecting said electrodes to said terminals includes a reversing switch to reverse the polarity of the potential applied to said electrodes.

3. The column of claim 1 wherein said thermoelectric elements are N and P type of semi-conductors spaced alternately between said electrodes.

4. An improved chromatographic column comprising an elongated tube having an inlet and an outlet and formed of electrically insulating material, packing material disposed within the interior of said tube, first, second, third and fourth fluid permeable electrodes positioned within said tube in series relationship between said inlet and said outlet in spaced relationship with one another, electrically conductive fluid permeable means extending between said first and second electrodes and between said third and fourth electrodes, said permeable means making electrical contact with the electrodes between which said means extend, said permeable means being formed of material which changes temperature when an electric current is passed therethrough, first and second sources of electric current, means connecting said first source between said first and second electrodes, and means connecting said second source between said third and fourth electrodes.

5. An improved chromatographic column comprising an elongated tube having an inlet and an outlet and formed of electrically insulating material, first and second fluid permeable electrodes positioned within said tube in spaced relationship with one another, a source of electric current connected between said electrodes, and a mass of particulate vitreous carbon extending between and making electrical contact with said electrodes so that passage of current through said carbon between said electrodes increases the temperature of the interior of said tube, said vitreous carbon constituting packing material of the column.

6. An improved method of changing the temperature within a chromatographic column containing packing material, which method comprises positioning within the column in contact with the packing material a material which changes temperature when an electric current is passed therethrough, and passing electric current through such material which changes temperature so as to change the temperature of the packing material.

7. The method of claim 5 wherein the material positioned within the column comprises a plurality of thermoelectric elements, the current is direct current, and further comprising the steps of reversing the direction of current flow through said thermoelectric elements periodically.

References Cited

UNITED STATES PATENTS 3,398,512    8/1968    Perkins et al. _____ 55—386

J. L. DeCESARE, Primary Examiner